(12) United States Patent
Cargile et al.

(10) Patent No.: US 6,673,301 B2
(45) Date of Patent: Jan. 6, 2004

(54) EXTRUSION BLOW-MOLDED SQUEEZABLE TUBE-SHAPED CONTAINER AND METHOD FOR MAKING SAME

(75) Inventors: David W. Cargile, Lititz, PA (US); Earle L. Ellis, York, PA (US); Roy N. Krohn, York, PA (US); David A. Kesselman, York, PA (US); Edward Roubal, Stewartstown, PA (US); Rafael F. Berrittella, Buenos Aires (AR); Norberto O. Gomez, San Luis (AR)

(73) Assignee: Graham Packaging Company, L.P., York, PA (US)

( * ) Notice: Subject to any disclaimer, the term of this patent is extended or adjusted under 35 U.S.C. 154(b) by 21 days.

(21) Appl. No.: 10/148,843

(22) PCT Filed: Nov. 2, 2001

(86) PCT No.: PCT/US01/45602

§ 371 (c)(1),
(2), (4) Date: Jun. 4, 2002

(87) PCT Pub. No.: WO02/38360

PCT Pub. Date: May 16, 2002

(65) Prior Publication Data

US 2002/0180114 A1 Dec. 5, 2002

Related U.S. Application Data

(60) Provisional application No. 60/246,778, filed on Nov. 8, 2000, and provisional application No. 60/318,155, filed on Sep. 7, 2001.

(51) Int. Cl.[7] .......................... B29C 49/24; B65D 35/08
(52) U.S. Cl. ...................... 264/509; 264/524; 264/536; 264/540; 156/86; 156/203; 428/36.9; 222/92; 222/206; 53/469; 53/473
(58) Field of Search ................................. 264/509, 524, 264/536, 540; 156/86, 203; 428/36.9; 222/92, 206

(56) References Cited

U.S. PATENT DOCUMENTS

| 3,197,532 | A | 7/1965 | Maass | 264/98 |
|---|---|---|---|---|
| 4,082,827 | A | 4/1978 | Chlystun | 264/98 |
| 4,470,521 | A | 9/1984 | Scammell | 222/107 |
| 4,529,108 | A | 7/1985 | Chlystun | 222/529 |
| 4,540,542 | A | 9/1985 | Weiler | 264/524 |
| 4,619,797 | A | 10/1986 | Chlystun | 264/40.1 |
| 4,733,801 | A | 3/1988 | Scammell | 222/107 |
| 4,806,021 | A | 2/1989 | Koudstaal et al. | 383/40 |
| 5,018,646 | A | 5/1991 | Billman et al. | 222/107 |
| 5,141,136 | A | 8/1992 | Tignor | 222/212 |
| 5,213,235 | A | 5/1993 | Miranda | 222/107 |
| 5,350,240 | A | 9/1994 | Billman et al. | 383/104 |
| 5,632,951 | A | 5/1997 | Smith et al. | 264/509 |
| 5,782,344 | A | 7/1998 | Edwards et al. | 206/217 |
| 5,860,743 | A | 1/1999 | Larkin et al. | 383/104 |
| 5,884,758 | A | 3/1999 | Sigouin et al. | 206/217 |
| 5,908,124 | A | 6/1999 | Klauke et al. | 215/48 |
| 5,918,783 | A | 7/1999 | Kieras et al. | 222/541.6 |
| 5,937,617 | A | 8/1999 | Yeager | 53/412 |
| 5,941,642 | A | 8/1999 | Darmstadter | 383/207 |
| 5,996,824 | A | 12/1999 | Grant et al. | 215/2 |
| 6,290,094 | B1 | 9/2001 | Arnold et al. | 220/839 |

*Primary Examiner*—Suzanne E. McDowell
(74) *Attorney, Agent, or Firm*—Howson and Howson

(57) ABSTRACT

A squeezable tube-shaped plastic container (10, 100) having a one-piece construction formed by extrusion blow-molding techniques. The container (10, 100) has a retractable end wall (26, 126) which is positionable into an outwardly projecting position and an inverted position. The end wall (26, 126), as blown, is in the outwardly projecting position and is thereafter inverted so that a tamper indicating covering (28, 128) can be attached to the end (14, 114) of the container (10, 100) thereby sealing the end wall (26, 126). The inverted end wall (26, 126) permits the container (10, 100) to be free standing on the standing ring (20, 120). In use, the flexible sidewall (12, 112) of the container (10, 100) is squeezed to snap the end wall (26, 126) from the inverted position to an outwardly projecting position to enable ready access to a dispensing opening (32, 132) on the end wall (26, 126). An efficient and cost effective method for forming the container (10, 100) and an intermediate article (44) formed during the method are also disclosed.

28 Claims, 8 Drawing Sheets

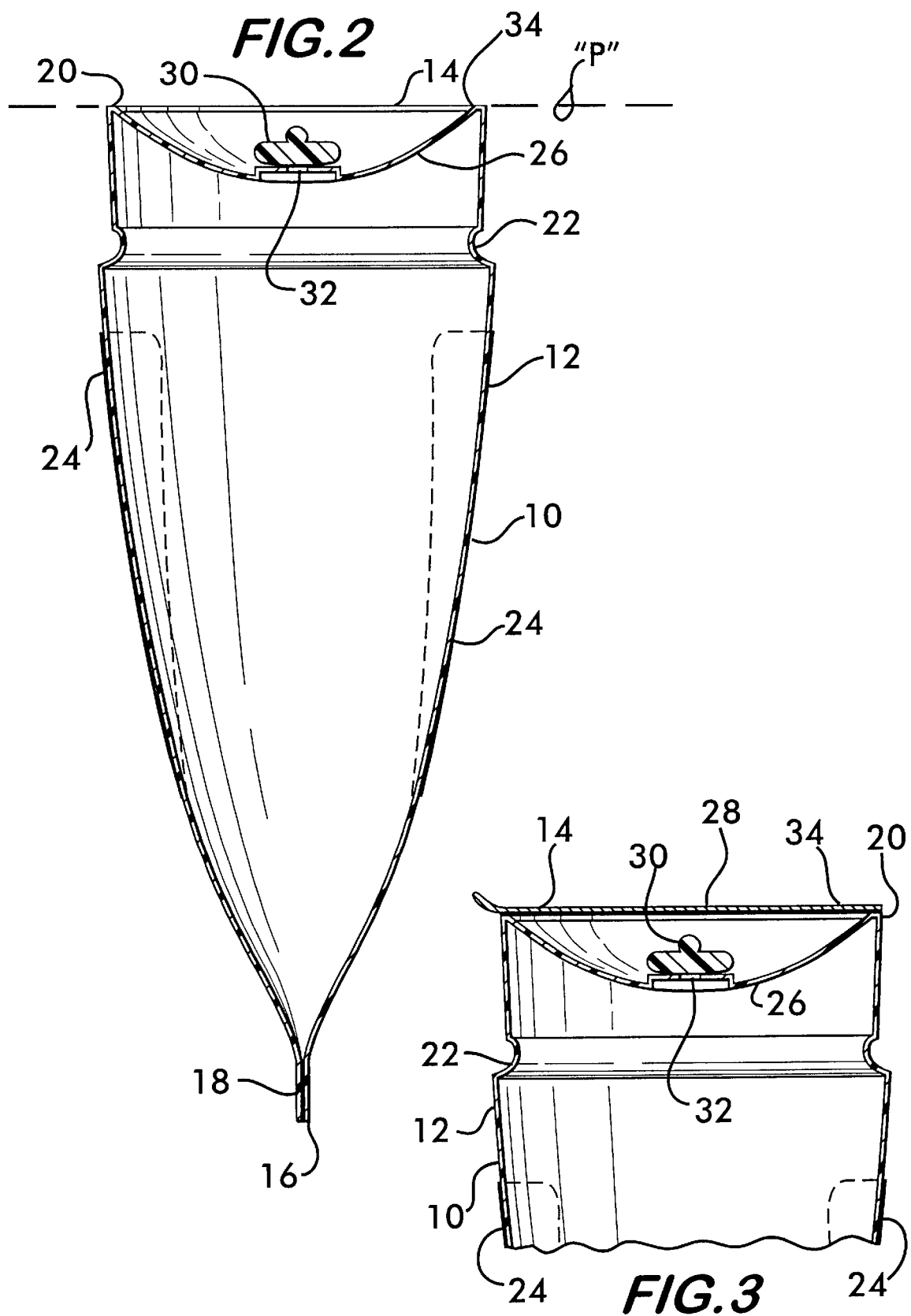

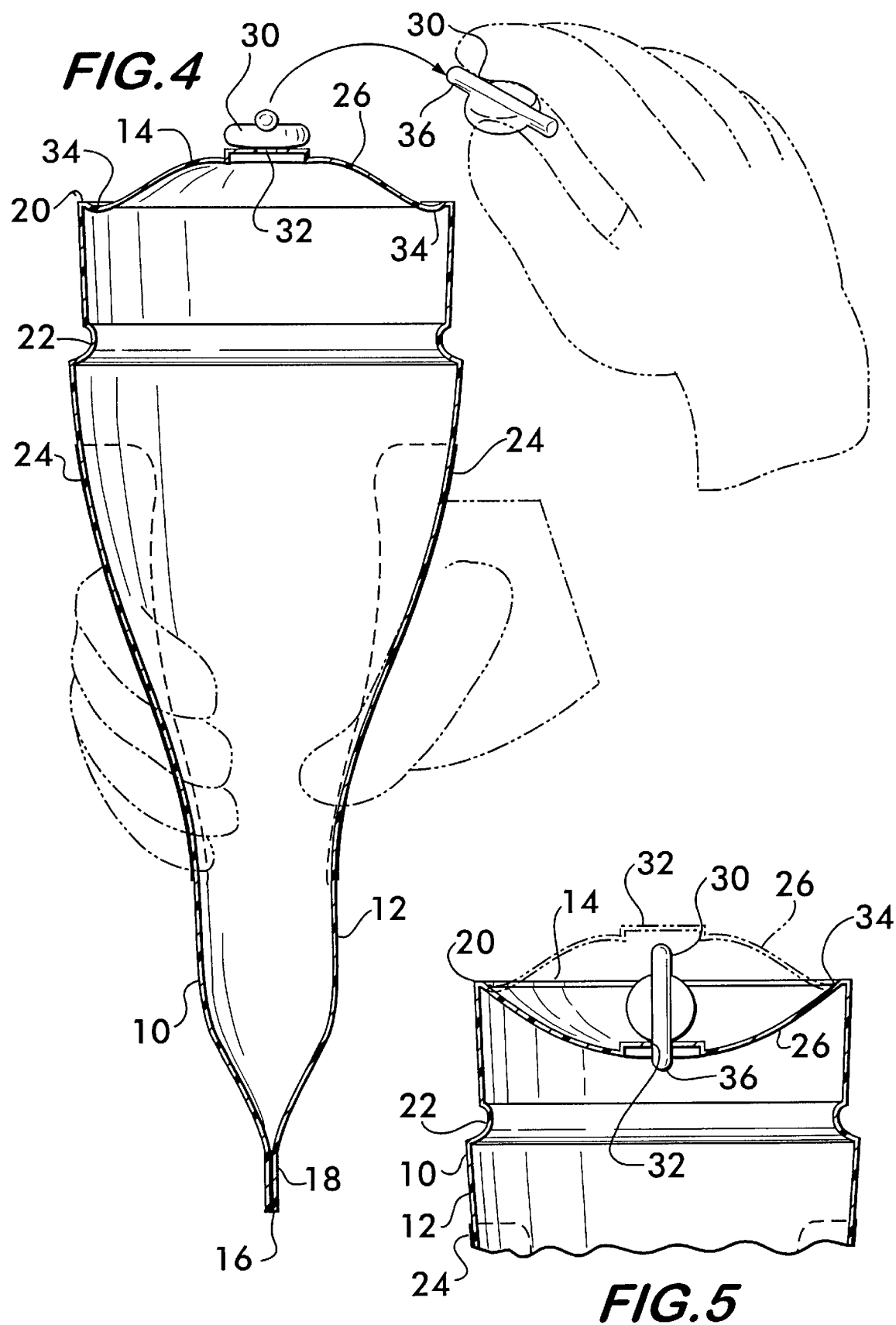

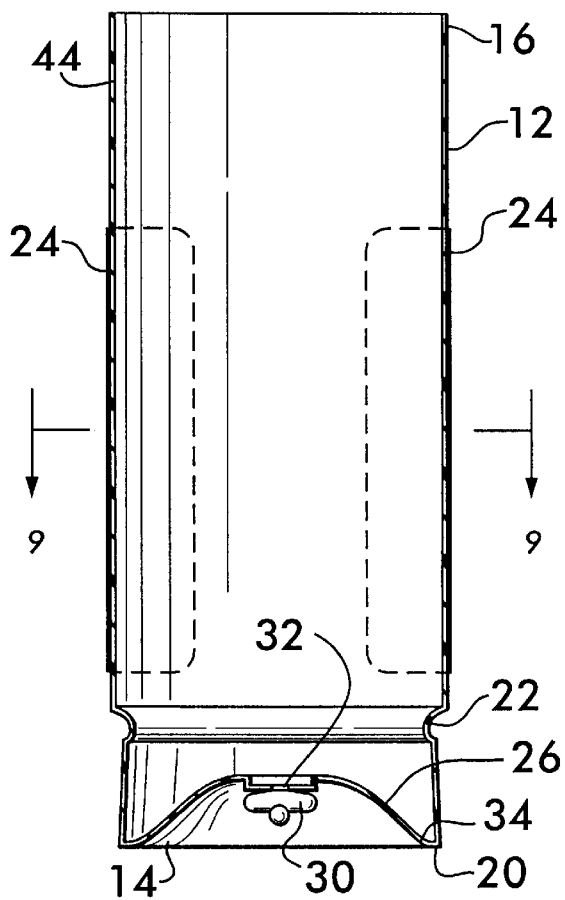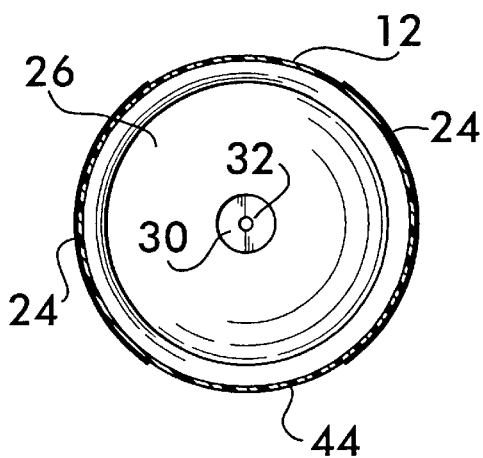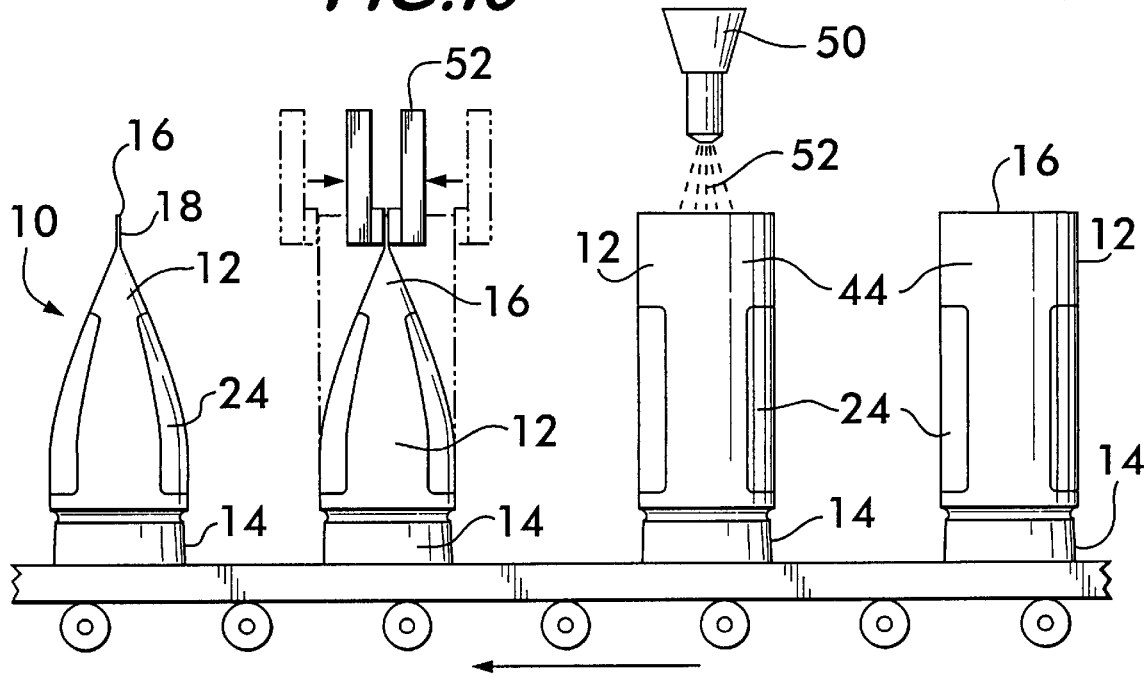

US 6,673,301 B2

EXTRUSION BLOW-MOLDED SQUEEZABLE TUBE-SHAPED CONTAINER AND METHOD FOR MAKING SAME

CROSS REFERENCE TO RELATED APPLICATIONS

This application is a 371 of PCT/US01/45602 which was filed on Nov. 2, 2001 and which claims the benefit of priority of U.S. Provisional Patent Application No. 60/246,778 filed on Nov. 8, 2000 and U.S. Provisional Patent Application No. 60/318,155 filed on Sep. 7, 2001.

FIELD OF THE INVENTION

The present invention relates to an extrusion blow-molded squeezable tube-shaped container for packaging food, cosmetic or other products, and more particularly, the present invention relates to a novel one-piece plastic tube-shaped container having a dispensing opening. The present invention also relates to a unique method for making a one-piece plastic tube-shaped container utilizing extrusion blow molding techniques.

BACKGROUND OF THE INVENTION

Various products, such as beverages, are sold to consumers in flexible plastic pouches. For example, U.S. Pat. Nos. 5,941,642 issued to Darmstadter, 5,884,758 issued to Sigouin et al., 5,860,743 issued to Larkin et al., 5,782,344 issued to Edwards et al., 5,350,240 and 5,018,646 issued to Billman et al., 4,806,021 issued to Koudstaal et al., and 5,937,617 issued to Yeager disclose flexible squeezable pouch containers for fluid or viscous food products. Most of the disclosed pouches require the use of a straw and are free standing on an end thereof in an upright position. All of the disclosed pouches are made from sheet material which is folded at one end and fused together along remaining confronting edges.

Another similar type of container typically utilized for packaging personal care or cosmetic products, such as toothpaste and lotions, is squeezable tube-shaped containers having a tubular body with one end heat-sealed along a straight line seam. For instance, see U.S. Pat. Nos. 5,632,951 issued to Smith, 3,197,532 issued to Maass, 5,908,124 issued to Klauke et al. and 5,213,235 issued to Miranda which disclose the use of blow molding techniques for forming tube-shaped containers. In addition, the Klauke patent discloses the formation of an integral twist-off closure to eliminate the need for providing a separately manufactured closure. Also see U.S. Pat. No. 4,540,542 which discloses a method of making an extrusion blow molded container with an integral removable closure and U.S. Pat. No. 5,141,136 which discloses a squeeze bottle having dual openings.

Another method for making a container for packaging a fluid, such as a carbonated beverage, is disclosed by U.S. Pat. Nos. 4,529,108 and 4,619,797 issued to Chlystun. The method includes blow molding a container body with an open end and a closed end. The closed end, as formed, includes an outwardly extending dome having an integral and retractable dispensing spout and a re-sealable closure therefor. Before filling through the open end, the outwardly extending dome and spout are inverted into the container body below an outer peripheral standing ring, and preferably, a protective foil is bonded to the standing ring to protect and prevent contamination of the dome and spout. After filling, the open end is secured to a separately manufactured disc-shaped base.

Although the above referenced squeezable pouch, tube-shaped and other containers and methods for their manufacture may function satisfactorily for their intended purposes, there is a need for a novel squeezable plastic tube-shaped container which has a cost-effective one-piece construction and which can be utilized to efficiently package liquid products such as juice and other beverages, viscous products such as yogurt, applesauce, pudding, lotions, and hand soaps, and solid products such as small bead-shaped pieces of candy or the like. Preferably, the container should have a closed end providing a dispensing opening and a filling end which is sealed with a seam after filling. The tube-shaped container should be capable of being free standing on its dispensing end and should be flexible to permit dispensing of its contents by squeezing of its sidewall. In addition, when the container contents are food or drink, the dispensing end should be protected from contamination and/or unrecognizable tampering before ultimate consumer purchase and use. Finally, the container should be made of a minimum of plastic, should be readily recyclable, and should be capable of being manufactured in a cost effective manner.

OBJECTS OF THE INVENTION

With the foregoing in mind, a primary object of the present invention is to provide a novel method of manufacturing a tube-shaped container having a one-piece construction.

Another object of the present invention is to provide a squeezable tube-shaped container capable of providing a cost effective package for a variety of different products including juices, milk, yogurt, pudding, sauces, lotions, hand soaps, gels, bead-shaped objects, candy and the like.

A further object of the present invention is to provide a squeezable tube-shaped container having a uniquely configured dispensing end which provides a surface for supporting the container in a free standing upright position, which can be readily protected from contamination and unrecognizable tampering, and which provides a unique manner of dispensing contents.

SUMMARY OF THE INVENTION

More specifically, the present invention provides a method of making a plastic squeezable tube-shaped container in which a plastic intermediate body is extrusion blow molded in a blow mold. The intermediate body has a flexible tubular sidewall with a standing ring located at a first end closed by an integrally formed end wall that, as blow molded, projects outwardly from the first end of the sidewall. A removable tab is simultaneously molded integral with the end wall in the blow mold during blow molding of the intermediate body, or alternatively, the end wall is blown with an upstanding finish capable of being sealed with a separately manufactured cap. After extrusion blow molding the body, the end wall is inverted about the standing ring so that the end wall extends entirely within the sidewall below a plane extending through the standing ring. An opposite end of the sidewall of the intermediate body is trimmed to form a filling opening, and after the end wall is inverted, the intermediate body is filled. Thereafter, the open end is sealed with a seam to create a filled squeezable plastic tube-shaped container. In use, the tab, or cap, is removed from the end wall to create a dispensing opening in the filled squeezable plastic tube-shaped container.

Preferably, the method includes the formation of a live hinge between the standing ring and the end wall such that the end wall snaps from an inverted position to an outwardly projecting position when the flexible sidewall of the filled plastic squeezable tube-shaped container is squeezed to enable ready access and removal of the integrally formed tab, or separately formed cap, and ready dispensing through the dispensing opening.

According to another aspect of the present invention, an intermediate article for use in forming a squeezable plastic tube-shaped container is provided. The article includes a flexible plastic extrusion blow molded tubular sidewall having a dispensing end and an open end. The dispensing end has a peripheral standing ring and includes an arcuate dome-shaped end wall. The end wall hinges relative to the standing ring from an as-formed outwardly projecting position to an inverted position in which the dome-shaped end wall extends within the sidewall below a plane extending through the standing ring. A compression molded tab projects outwardly from the end wall and is removable from the dome-shaped end wall to create a dispensing opening in the squeezable plastic tube-shaped container. Alternatively, the end wall has an upstanding finish which provides a dispensing opening and which is sealed with a separately manufactured cap. The tab, or cap, is positioned within the sidewall below a plane extending through the standing ring when the end wall is in the inverted position.

According to yet another aspect of the present invention, a squeezable plastic tube-shaped container is provided with a flexible plastic extrusion blow molded sidewall having a dispensing end defined by a peripheral circular standing ring and an opposite filling end sealed closed with a seam. An end wall is blow molded integrally with the sidewall, extends from the standing ring, and closes the dispensing end of the container. The end wall is positionable in a storage position in which the end wall is concave and extends inwardly within the sidewall completely below a plane extending through the standing ring. A twist-off tab, or cap receiving finish projects outwardly from the end wall and is located between the end wall and the plane extending through the standing ring when the end wall is in the storage position. The twist-off tab, or cap, is removable from the end wall for creating a dispensing opening in the squeezable plastic tube-shaped container.

Preferably, the container has a live hinge between the standing ring and the end wall to enable the end wall to snap outwardly from the dispensing end of the sidewall and extend in a substantially convex shape above the plane extending through the standing ring when the flexible sidewall is squeezed. This enables ready access and removal of the twist-off tab, or cap, and ready dispensing through the dispensing opening created by removal of the twist-off tab, or cap.

BRIEF DESCRIPTION OF THE DRAWINGS

The foregoing and other objects, features and advantages of the present invention should become apparent from the following description when taken in conjunction with the accompanying drawings, in which:

FIG. 2 is a cross sectional view of the container of FIG. 1 taken along line 2—2;

FIG. 3 is a cross-sectional view of the dispensing end of the container of FIG. 1 having a tamper indicating covering bonded thereto;

FIG. 4 is a cross-sectional view of the container of FIG. 1 in which the container is being grasped and squeezed and the twist-off tear tab is being removed;

FIG. 5 is a cross-sectional view of the dispensing end of the container of FIG. 1 having the removed twist-off tab being used as a plug to close the dispensing opening;

FIG. 8 is a cross-sectional view of the intermediate article of FIG. 6 in which the dispensing end has been inverted and the filling end has been trimmed open;

FIG. 9 is a cross-sectional view of the intermediate article taken along line 9—9 of FIG. 8;

FIG. 10 is an elevational view illustrating the method steps of filling and heat sealing the open end of the intermediate article to form a filled squeezable plastic tube-shaped container;

DETAILED DESCRIPTION OF THE PREFERRED EMBODIMENT

Figure 1:
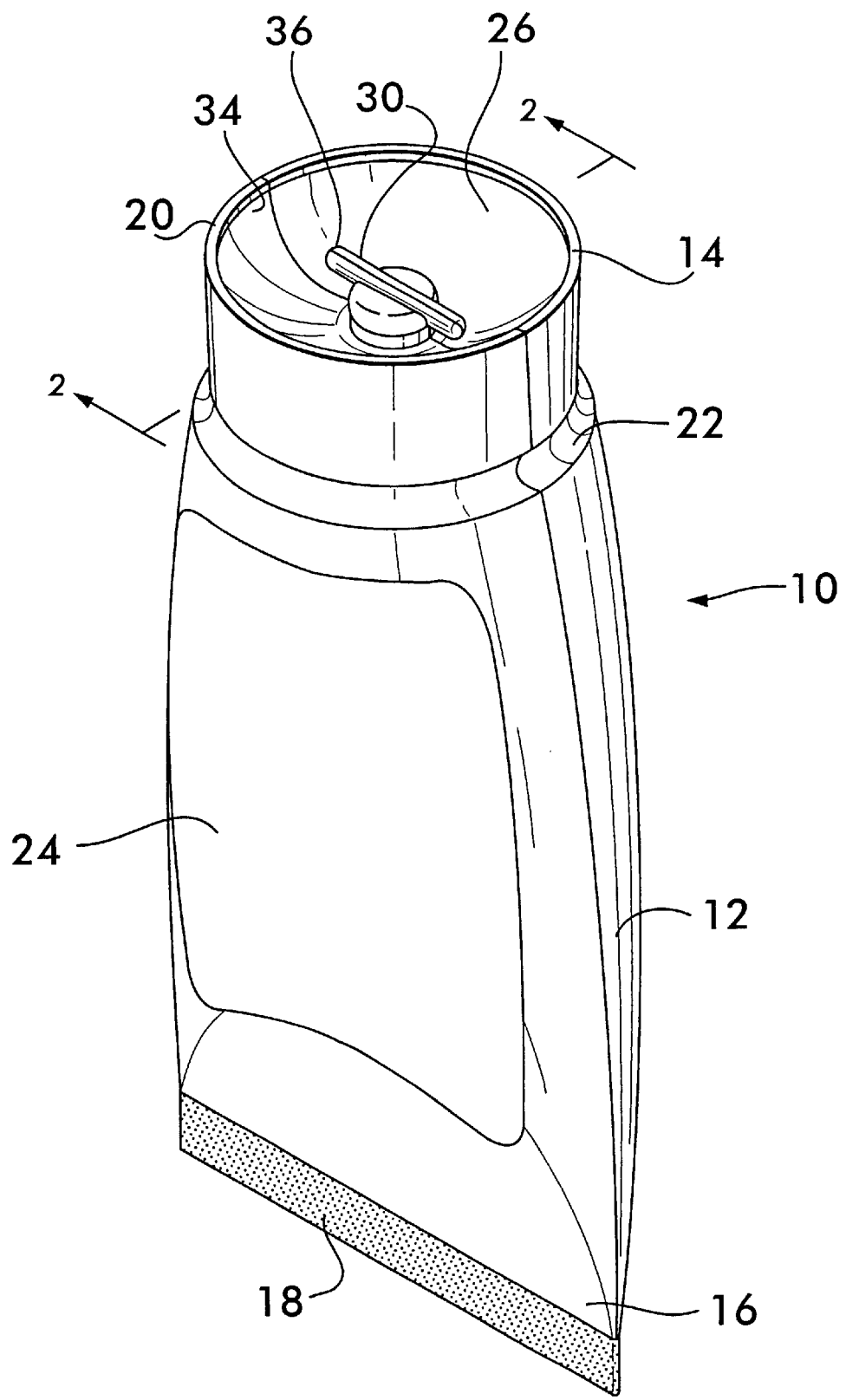
FIG. 1 is a perspective view of a first embodiment of a squeezable plastic tube-shaped container embodying the present invention.

FIG. 1 illustrates a squeezable tube-shaped container 10 embodying the present invention. The container 10 has a one-piece construction and is uniformly made of a monolayer plastic material, such as LDPE, or a multilayer plastic material. The container 10 can be used to package a wide variety of liquid, viscous or solid products including, for example, juices, other beverages, yogurt, sauces, pudding, lotions, soaps in liquid or gel form, and bead shaped objects such as candy. The container 10 is made by a novel method which utilizes extrusion blow molding techniques and which includes the formation of a unique intermediate article, both of which will be discussed in detail.

Turning first to the structural aspects of the tube-shaped container 10, it has a flexible sidewall 12 with opposite ends 14 and 16. A first end 14 is the dispensing end of the container 10, and the second end 16, which is opposite from the dispensing end 14, is utilized to fill the container 10 and is thereafter heat sealed to preferably form a straight line, planar seam 18 as illustrated in FIG. 1.

Preferably, the sidewall 12, as formed, is substantially tubular and has a circular transverse cross section. The sidewall 12 is flexible and enables the end 16 to be flattened into the planar seam 18 thereby providing a conventional tube-shaped configuration. The sidewall 12 terminates adjacent the dispensing end 14 in a circular standing ring 20 on which the container can be freely stood with the seam 18 facing upwardly. For example, see FIG. 10. Preferably, a circumferential inset groove 22 is formed in the sidewall 12 a spaced distance from the standing ring 20 to prevent ovalization of the standing ring 20 and reinforce the adjacent section of the sidewall 12. In addition, preferably the sidewall 12 is applied with a label 24.

The dispensing end 14 of the filled tube-shaped container 10 has an arcuate end wall 26 extending from the standing ring 20 and closing the dispensing end 14. As illustrated in FIGS. 1–3, the end wall 26 is provided in a concave position extending within the sidewall 12 and below an imaginary plane "P" extending through the standing ring 20. Thus, the end wall 26 as illustrated in FIGS. 1–3 has an inverted dome shape and can be said to be in a storage position since the end wall 26 does not interfere with the free standing of the container 10 on the standing ring 20 and permits a tamper indicating covering 28 to be bonded to the standing ring 20 as best illustrated in FIG. 3. The covering 28 can be a foil or other sheet-like covering and can be utilized to prevent contamination or unrecognizable tampering of the dispensing end 14 of the container 10 before its removal by the purchasing consumer.

According to a first embodiment of the present invention as shown in FIGS. 1–9, a removable tab 30, such as a twist-off tab, provides a means of creating a dispensing opening 32 in the end wall 26. To this end, the tab 30 is formed integrally with the end wall 26 and projects outwardly therefrom relative to the container sidewall 12. Preferably, the twist-off tab 30 extends from a central, or apex, region 32 of the arcuate end wall 26 so that, when the end wall 26 is in the concave, or inverted, position, the twist-off tab 30 is confined within the sidewall 12 and between the end wall 26 and the imaginary plane "P" extending through the standing ring 20. See FIGS. 2 and 3. Thus, when the end wall 26 is in the storage position, both the end wall 26 and the twist-off tab 30 are located below the standing ring 20 to enable free standing of the container 10 on the standing ring 20 and to enable bonding of the tamper indicating covering 28 to the standing ring 20.

One of the novel aspects of the present invention is that a live hinge 34 is formed at the interconnection of the standing ring 20 and the end wall 26 which enables the end wall 26 to snap from the concave position as illustrated in FIGS. 1–3 to an outwardly projecting, or convex, position as best illustrated in FIG. 4. Thus, in use, the covering 28 is removed, and the flexible sidewall 12 is grasped and squeezed resulting in the end wall 26 extending outwardly. This elevates the twist-off tab 30 to a readily accessible location and permits the tab 30 to be readily grasped and twisted off the end wall 26 thereby creating the dispensing opening 32. Thereafter, a desired quantity of the contained product can be dispensed by squeezing the flexible sidewall 12. Preferably, the twist-off tab 30 can be formed with lateral projections 36 which can be utilized to plug the dispensing opening 32 created by removal of the tab 30. Thus, as best illustrated in FIG. 5, the dispensing opening 32 can be temporarily closed by the tab 30 and the end wall 26 can be relocated into its concave storage position.

FIGS. 11—14 illustrate an alternate embodiment of a squeezable tube-shaped container 100 embodying the present invention. The container 100 is identical in every respect to container 10, except that the container 100 is provided with an upstanding finish which is sealed with a separately manufactured cap as will be discussed.

Thus, the tube-shaped container 100 has a flexible sidewall 112 with opposite ends. A first end 114 is the dispensing end of the container 100, and a second end (not shown) is opposite from the dispensing end 114 and is utilized to fill the container 100 and is thereafter heat sealed to form a seam (not shown).

Figure 15:
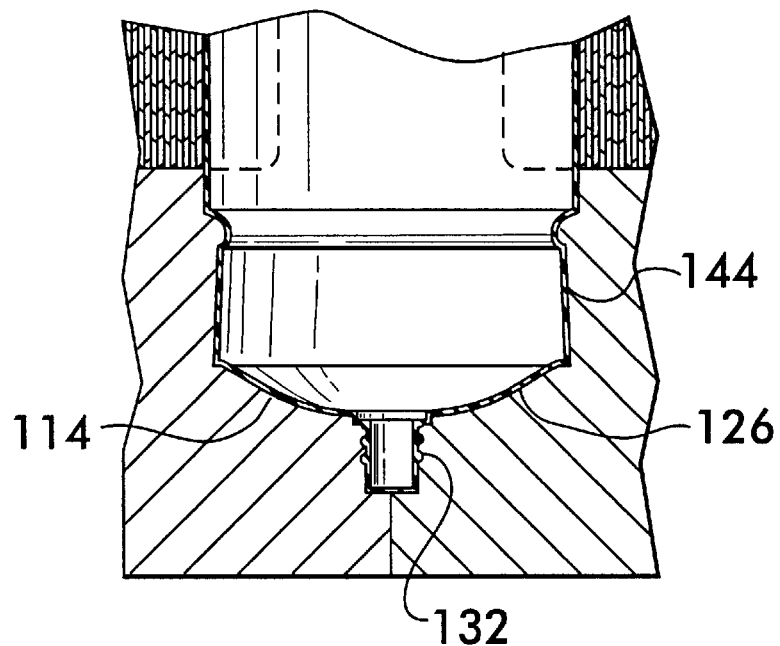
FIG. 15 is a cross-sectional view of a portion of a closed blow-mold having an inner cavity against which a parison has been blown to form an alternate embodiment of an intermediate article according to the present invention.
Figure 16:
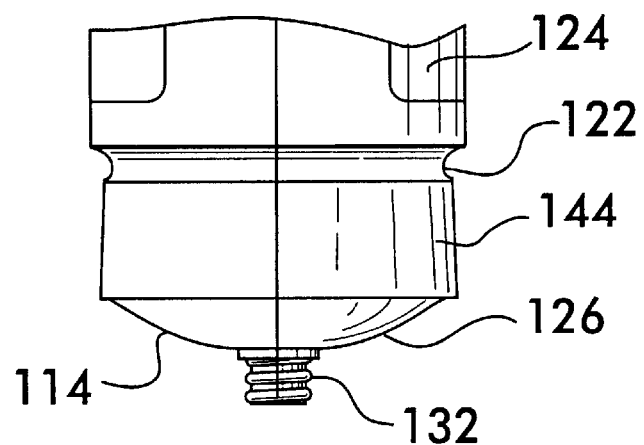
FIG. 16 is an elevational view of the dispensing end of the intermediate article illustrated in FIG. 15.

Preferably, the sidewall 112, as formed, is substantially tubular and has a circular transverse cross section. For instance, see FIGS. 15 and 16. The sidewall 112 is flexible and enables the filling end to be seamed. The sidewall 112 terminates adjacent the dispensing end 114 in a circular standing ring 120 on which the container can be freely stood with the seam facing upwardly. Preferably, a circumferential inset groove 122 is formed in the sidewall 112 a spaced distance from the standing ring 120 to prevent ovalization of the standing ring 120 and reinforce the adjacent section of the sidewall 112. In addition, preferably the sidewall 112 is applied with a label 124.

Figure 11:
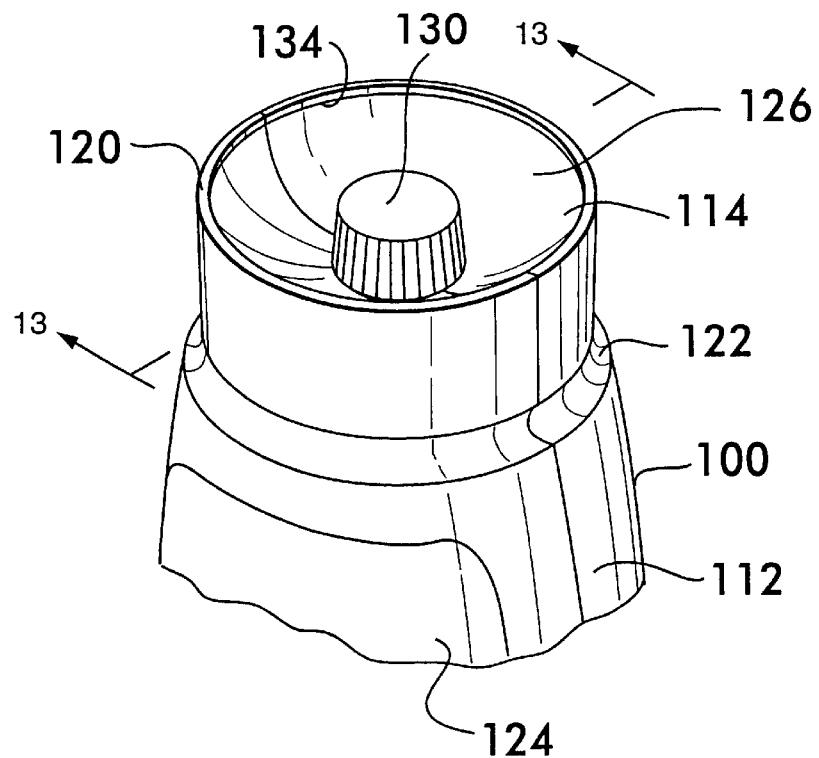
FIG. 11 is a perspective view of the dispensing end of an alternate embodiment of a squeezable plastic tube-shaped container embodying the present invention.
Figure 13:
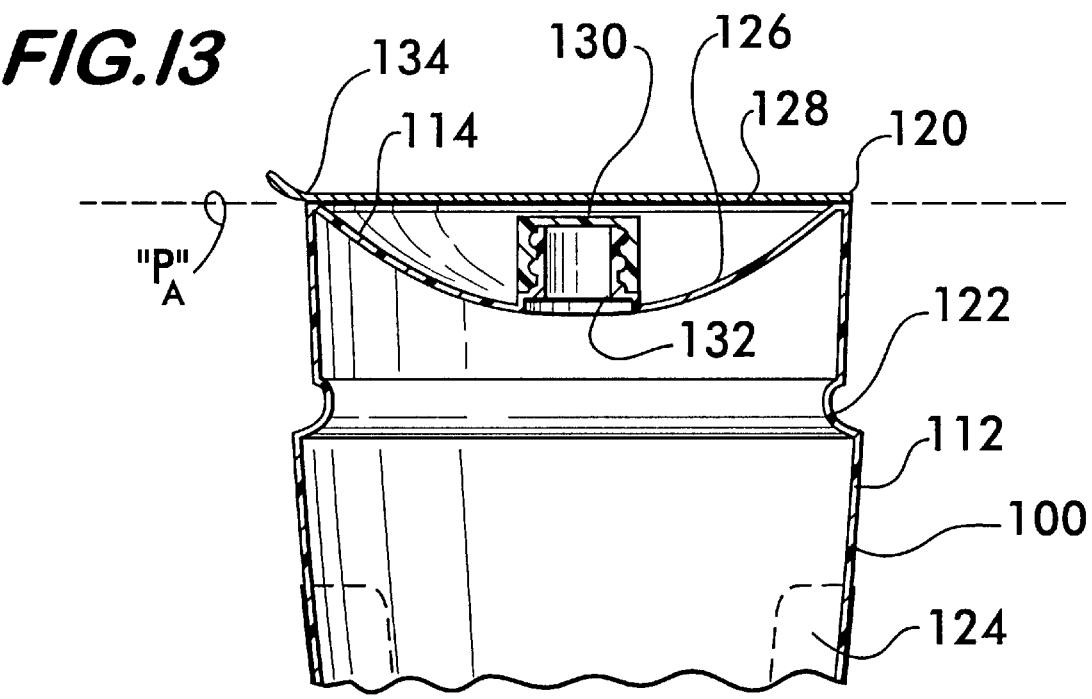
FIG. 13 is a cross-sectional view of the container of FIG. 11 taken along line 13—13 and having a tamper indicating covering bonded thereto.

The dispensing end 114 of the filled tube-shaped container 100 has a bowl-shaped end wall 126 extending from the standing ring 120 and closing the dispensing end 114. As illustrated in FIGS. 11 and 13, the end wall 126 is provided in a concave position extending within the sidewall 112 and below an imaginary plane "$P_A$" extending through the standing ring 120. Thus, the end wall 126 as illustrated in FIGS. 11 and 13 has an inverted dome shape and can be said to be in a storage position since the end wall 126 does not interfere with the free standing of the container 100 on the standing ring 120 and permits a tamper indicating covering 128 to be bonded to the standing ring 120 as best illustrated in FIG. 13. The covering 128 can be a foil or other sheet-like covering and can be utilized to prevent contamination or unrecognizable tampering of the dispensing end 114 of the container 100 before its removal by the purchasing consumer.

According to the alternate embodiment of the present invention as shown in FIGS. 11–16, a separately manufactured closure, or cap, 130 is utilized to seal an upstanding finish 132 projecting from center of the end wall 126. To this end, the cap 130 and finish 132 can be provided with cooperating threads, as shown, or alternatively, can be frictionally engaged or snap-fit. Preferably, when the end wall 126 is in the concave, or inverted, position, the cap 130 and finish 132 are confined within the sidewall 112 and below the imaginary plane "$P_A$" extending through the standing ring 120. See FIG. 11. Thus, when the end wall 126 is in the storage position, the end wall 126, the cap 130 and the finish 132 are all located below the standing ring 120 to enable free standing of the container 100 on the standing ring 120 and to enable bonding of the tamper indicating covering 128 to the standing ring 120.

Figure 12:
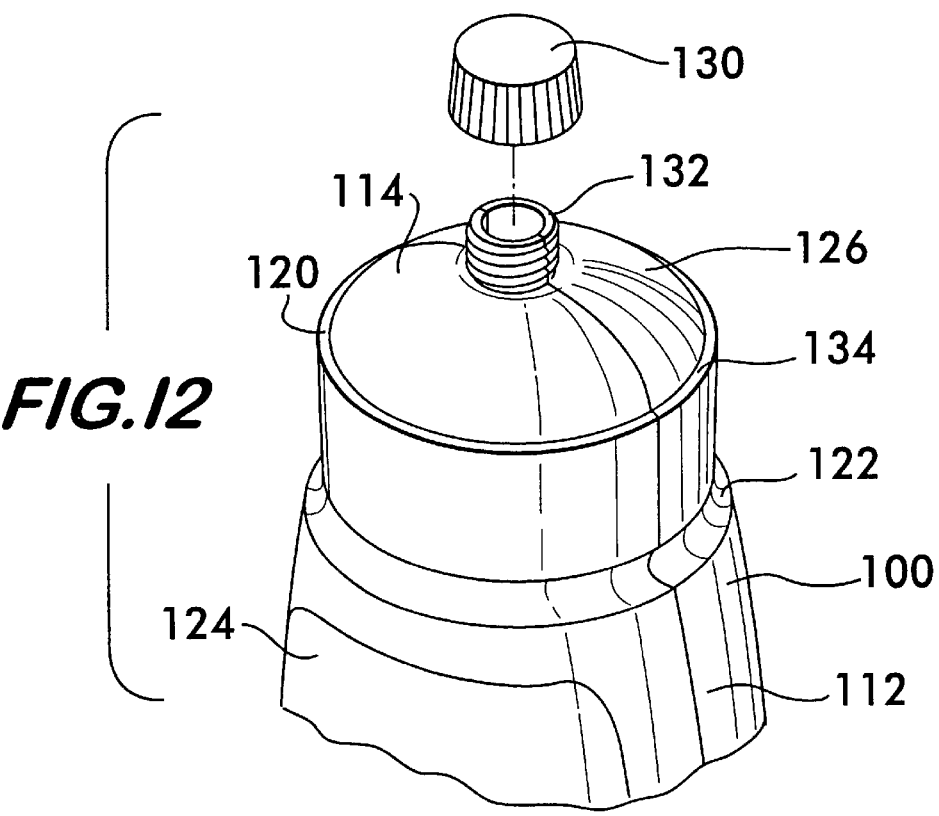
FIG. 12 is a perspective view of the dispensing end of the container shown in FIG. 11 in which end wall has been displaced outwardly (ie., the container body is being squeezed) and the separately manufactured cap is being removed.
Figure 14:
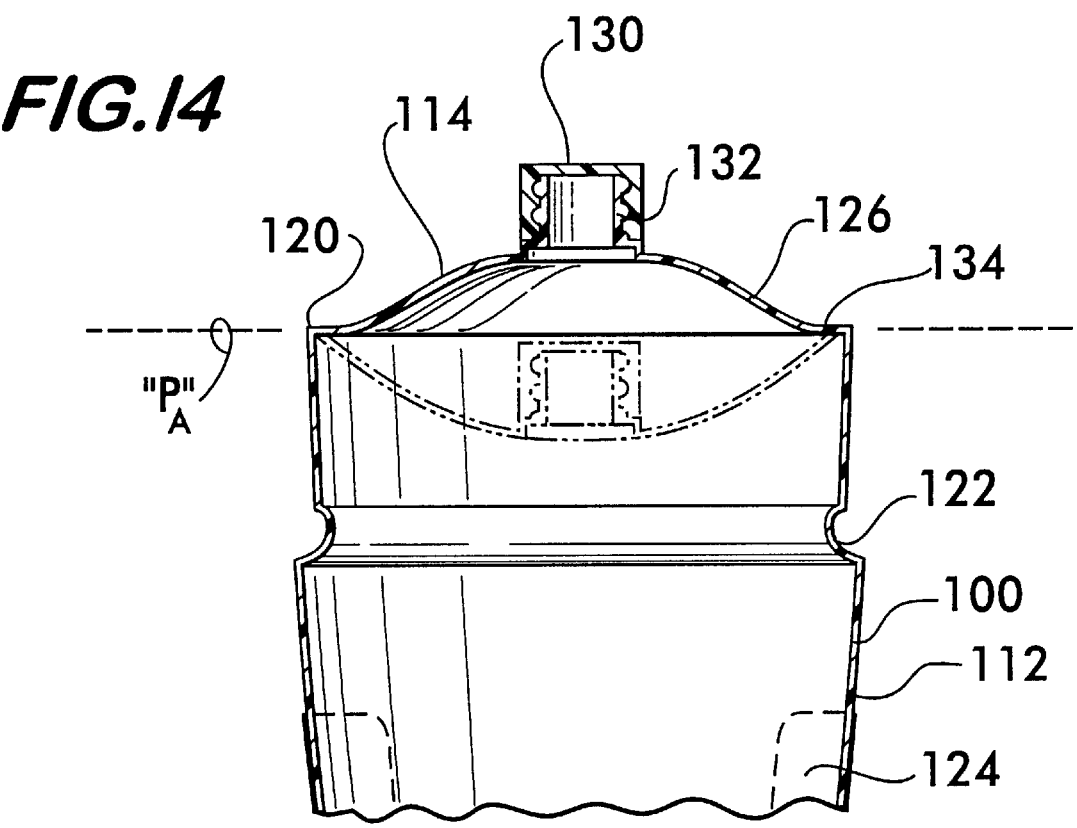
FIG. 14 is a cross-sectional view of the dispensing end of the container of FIG. 11 in which the end wall is displaced outwardly such as when the body of the container is squeezed.

Similar to container 10, container 100 has a live hinge 134 formed at the interconnection of the standing ring 120 and the end wall 126 which enables the end wall 126 to snap from the concave position as illustrated in FIGS. 11 and 13 to an outwardly projecting, or convex, position as best illustrated in FIGS. 12 and 14. Thus, in use, the covering 128 is removed, and the flexible sidewall 112 is grasped and squeezed resulting in the end wall 126 extending outwardly. This elevates the finish 132 and removable cap 130 to a readily accessible location and permits the cap 130 to be readily grasped and twisted off the end wall 126 thereby creating a dispensing opening. Thereafter, a desired quantity of the contained product can be dispensed by squeezing the flexible sidewall 112. The cap 130 can be reapplied to the finish 132 to reseal the container and the end wall 126 will relocate to its original concave storage position after the sidewall of the container is no longer being squeezed.

Thus, the containers 10 and 100 provide a unique package particularly useful as a single serve food or drink package, or a package for cosmetic or other products. The container 10 does not require the use of a separately manufactured closure, and the dispensing ends of the containers 10 and 100 can be protected from contamination and unrecognizable tampering prior to use by a purchasing consumer. The containers 10 and 100 provide a novel retractable end wall structure which includes an integrally formed removable tab, or upstanding finish and removable cap, that permits the containers 10 and 100 to be stood upright on their standing rings, and permits the application of tamper indicating coverings.

DETAILED DESCRIPTION OF THE PREFERRED METHOD

Figures 6, 7:
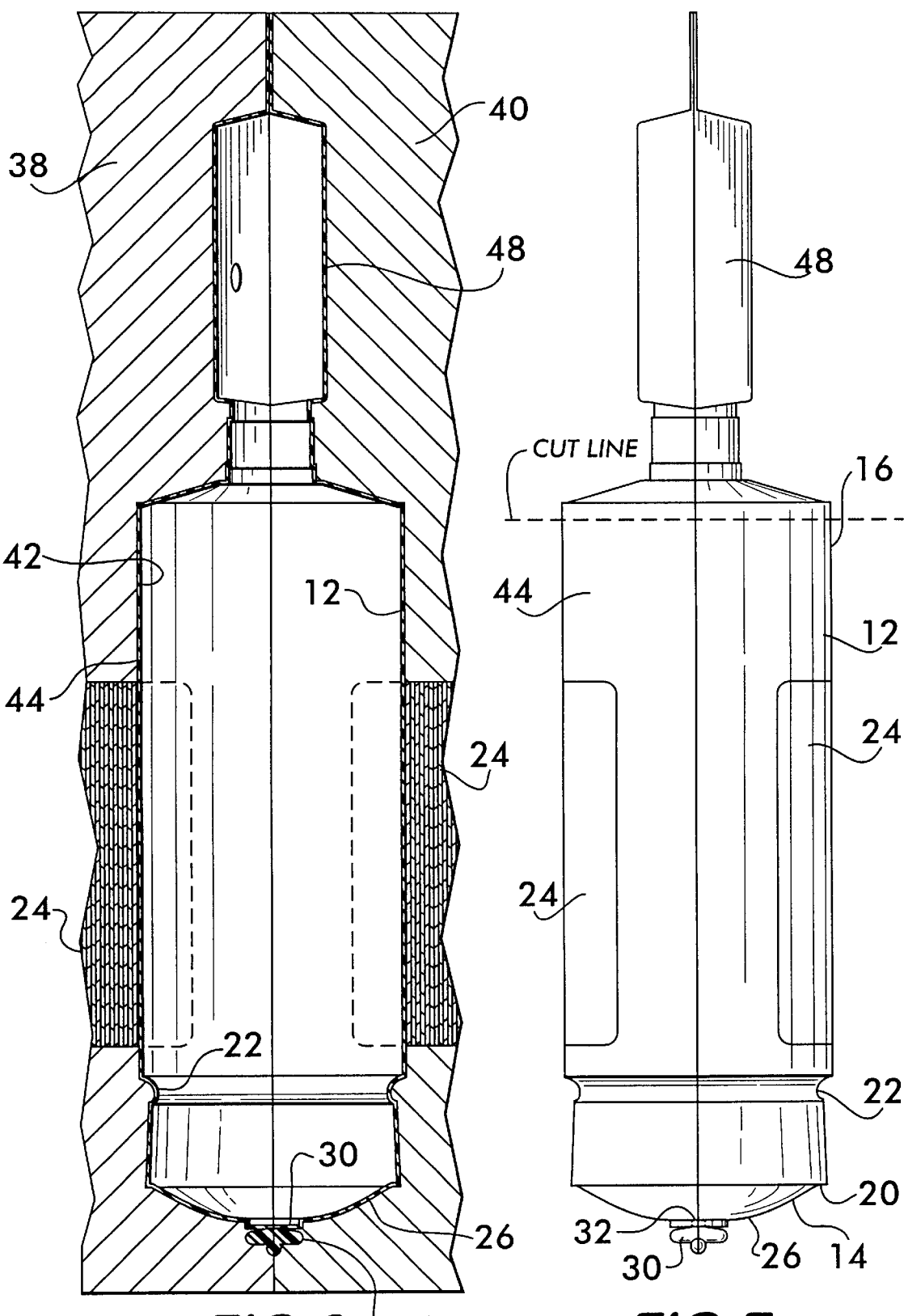
FIG. 6 is a cross-sectional view of a closed blow-mold having an inner cavity against which a parison has been blown to form a intermediate article.
FIG. 7 is an elevational view of the intermediate article illustrated in FIG. 6.

The above described tube-shaped container 10 is made by a method in which the flexible sidewall 12 and end wall 26 is formed by extrusion blow molding techniques. To this end, a molten tube of thermoplastic material, or plastic parison, is extruded relative to a pair of open blow mold halves, 38 and 40. As best illustrated in FIG. 6, the blow mold halves, 38 and 40, close about the parison and cooperate to provide a cavity 42 into which the parison is blown to form an intermediate article 44. The cavity 42 forms a substantially tubular sidewall 12 and an outwardly projecting end wall 26 as illustrated in FIG. 6. The cavity 42 also includes a compression molding section 46 which compresses a portion of the parison to form the tab 30. This is accomplished simultaneously with the blowing of the sidewall 12 and end wall 26. Thus, the twist-off tab 30 is molded integrally with the outwardly bowed end wall 12 in the blow mold, 38 and 40.

Preferably, the blow mold, 38 and 40, is also utilized to bond labels 24 to the sidewall 12. To this end, labels 24 are positioned in the cavity 42 of the blow mold, 38 and 40, just before the parison is about to be inflated. Thus, when the parison is inflated, the molten plastic is blown into engagement with the labels 24, and a heat sensitive adhesive on the labels 24 activates to bond the labels 24 to the sidewall 12 of the blown intermediate body 44. Since the labels 24 are applied in-mold, the sidewall 12 is formed about the labels 24 such that the labels 24 are sunken in the sidewall 12 creating a smooth container outer surface even at the transition at the edges of the labels 24. As best illustrated in FIG. 7, the intermediate body 44 is removed from the mold halves, 38 and 40, having an outwardly projecting end wall 26, a labeled substantially cylindrical sidewall 12, and flash, or scrap, material 48 extending from said sidewall 12 opposite from said end wall 26.

After being removed from the blow mold halves, 38 and 40, the sidewall 12 is trimmed at the "cut line" identified in FIG. 7 to remove the scrap material 48 from the sidewall 12 and to create an open filling end 16 opposite the end wall 26. The filling end 16 is flexible and has a substantially circular transverse cross-section. In addition, the end wall 26 of the intermediate body 42 is inverted about the standing ring 20 from its as blown outwardly projecting position to an inwardly concave position. This locates the end wall 26 and removable tab 30 entirely within the sidewall 12 below the imaginary plane "P" extending through the standing ring 20. Thus, as illustrated in FIG. 8, the intermediate body 44 has a tubular labeled sidewall 12 with an inverted end wall 26 and an open filling end 16. If the intermediate body 44 is to be filled with a food or drink product, a tamper evident covering 28 is bonded to the standing ring 20 before the intermediate body 44 is filled to prevent contamination of the end wall 26 and integral twist-off tab 30.

As illustrated in FIG. 10, the intermediate body 44 is processed through a filling station 50 in which a product 52 is supplied via the open end 16 into the intermediate body 44. After filling, the open end 16 of the intermediate body 44 is processed through a heat sealing station 54 to close the open end 16 and produce a closed planar seam 18. The result is a filled squeezable tube-shaped container 10 as illustrated in the left hand side of FIG. 10.

As previously stated, the structure of the dispensing end 14 creates a live hinge 34 at the interconnection of the standing ring 20 and the end wall 26. This permits the end wall 26 to be retracted into a concave position before filling and as stored, and then, be popped outwardly so that the container 10 can be opened and its contents dispensed. The sidewall 12 is flexible and is squeezed to pop the end wall 26 outwardly.

The container 100 is manufactured in substantially the same manner that container 10 is manufactured. However, an upstanding finish 132 is formed in the blow mold instead of an integral tear off tab. See FIG. 15. Flash is trimmed from the finish 132 to create a dispensing opening and to permit the application of a separately manufactured closure 130. The closure 130 can be utilized to invert the endwall 126 of the intermediate article 144 illustrated in FIG. 16 as it is initially applied to the finish 132, and the closure 130 and tamper strip 128, if desired, must be applied to the finish 132 before the container 100 is filled.

Thus, the described containers, intermediate articles, and methods of making the containers provide a unique and cost-effective package which can be produced inexpensively by extrusion blow molding techniques. The container and method provide a tube-shaped container having a retractable end wall which permits ready and uncomplicated application of a tamper indicating and contamination preventing covering, which enables the container to be free standing, and which enables ready access and removal of the integrally formed twist-off tab, or applied closure.

While preferred containers, intermediate articles and methods have been described in detail, various modifications, alterations, and changes may be made without departing from the spirit and scope of the present invention as defined in the appended claims.

What is claimed is:

1. A method of making a plastic squeezable tube-shaped container (10, 100), comprising the steps of:

extrusion blow molding in a blow mold (38, 40) a plastic intermediate body (44) having a flexible tubular sidewall (12, 112) with a standing ring (20, 120) and an end wall (26, 126) at a first end (14, 114) thereof, said end wall (26, 126), as formed, projecting outwardly from said first end (26, 126) of said sidewall (12, 112); and inverting said as formed outwardly projecting end wall (26, 126) of said intermediate body (44) about said standing ring (20, 120) to an inverted position so that said end wall (26, 126) extends entirely within said sidewall (12, 112) below an imaginary plane (P, $P_A$) extending through said standing ring (20, 120);

wherein, during said blow molding step, a hinged interconnection (34, 134) is formed between said standing ring (20, 120) and said end wall (26, 126) that permits said end wall (26, 126) to snap from said inverted position to an outwardly projecting position relative to said sidewall (12, 112) during a dispensing operation.

2. A method according to claim 1, further comprising the steps of removing said intermediate body (44) from said blow mold (38, 40) and trimming a second end (16) of said sidewall (12, 112) of said intermediate body (44) located opposite from said end wall (26, 126) such that said second end (16) is open.

3. A method according to claim 2, further comprising the steps of filling said intermediate body (44) via said open second end (16) and thereafter sealing said second end (16) with a seam (18) to create a filled squeezable plastic tube-shaped container (10, 100), wherein said step of filling said intermediate body (44) is accomplished after said step of inverting said end wall (26, 126).

4. A method according to claim 3, wherein said standing ring (20, 120) forms a support surface on which said intermediate body (44) is supportable in an upright position when said end wall (26, 126) is positioned in said inverted position.

5. A method according to claim 3, further comprising the step of bonding a sheet-like tamper-indication covering (28, 128) to said standing ring (20, 120) of said intermediate body (44) to extend over said end wall (26, 126) and to seal and prevent contamination of said end wall (26, 126), said step of bonding said covering (28, 128) to said sidewall (12, 112) being accomplished after said step of inverting said end wall (26, 126).

6. A method according to claim 3, further comprising the step of forming in said blow mold (38, 40) a removable tab (30) integral with said end wall (26), said tab (30) ultimately being removable from said end wall (26) to create a dispensing opening (32) in the plastic squeezable tube-shaped container (10).

7. A method according to claim 3, wherein said flexible tubular sidewall (12, 112) has a substantially cylindrical shape, as formed, and wherein said end wall (26, 126) is dish-shaped and arcuate in both said outwardly projecting and inverted positions.

8. A method according to claim 7, wherein said end wall (26, 126) as formed in said outwardly projecting position has an apex, and wherein a dispensing opening (32, 132) is provided at said apex.

9. A method according to claim 1, further comprising the step of applying a label (24, 124) to said intermediate body (44) in said blow mold (38, 40) simultaneous with said extrusion blow molding step.

10. A method of making a plastic squeezable tube-shaped container (10, 100), comprising the steps of:
    extrusion blow molding in a blow mold (38, 40) a plastic intermediate body (44) having a flexible tubular sidewall (12, 112) with a standing ring (20, 120) and an end wall (26, 126) at a first end (14, 114) thereof, said end wall (26, 126), as formed, projecting outwardly from said first end (14, 114) of said sidewall (12, 112);
    after said extrusion blow molding step, inverting said as formed outwardly projecting end wall (26, 126) of said intermediate body (44) about said standing ring (20, 120) to an inverted position so that said end wall (26, 126) extends entirely within said sidewall (12, 112) below a plane (P, $P_A$) extending through said standing ring (20, 120);
    trimming a second end (16) of said sidewall (12, 112) of said intermediate body (44) located opposite from said end wall (26, 126) such that said second end (16) is open;
    filling said intermediate body (44) via said open second end (16) after said inverting step; and
    sealing said second end (16) with a seam (18) after said filling step to create a filled squeezable plastic tube-shaped container (10, 100);

whereby one of a closure and integrally formed tab is removable from said end wall to create a dispensing opening in the filled squeezable plastic tube-shaped container.

11. A method according to claim 10, wherein, during said blow molding step, a hinged interconnection (34, 134) is formed between said standing ring (20, 120) and said end wall (26, 126) that permits said end wall (26, 126) to snap between said inverted position and an outwardly projecting position relative to said sidewall (12, 112) of the filled squeezable plastic tube-shaped container (10, 100) when said flexible sidewall (12, 112) of the filled plastic squeezable tube-shaped container (10, 100) is squeezed to enable ready access to a dispensing opening (32, 132) in said end wall (26, 126).

12. A method according to claim 11, further comprising the step of applying at least one label (24, 124) to said sidewall (12, 112) of said intermediate body (44) in said blow mold (38, 40) simultaneous with said extrusion blow molding.

13. A method according to claim 11, wherein said flexible tubular sidewall (12, 112) has a substantially cylindrical shape, as formed; wherein said end wall (26, 126) is arcuate in both said outwardly projecting and inverted positions and has a central apex, and wherein said dispensing opening (32, 132) is formed at said apex of said end wall (26, 126).

14. A method according to claim 13, further comprising the step of bonding a sheet-like tamper-indication covering (28, 128) to said standing ring (20, 120) of said intermediate body (44) after said inverting step and before said filling step to seal and prevent contamination of said end wall (26, 126).

15. A method according to claim 10, further comprising a step of compression molding in said blow mold (38, 40) a removable tab (30) integral with said end wall (26), said compression molding step occurring substantially simultaneous with said blow molding step.

16. An intermediate article (44) for use in forming a squeezable plastic tube-shaped container (10, 100), comprising:
    a flexible plastic extrusion blow molded tubular sidewall (12, 112) having a closed end (14, 114) and an open end (16), and
    said closed end (14, 114) of said sidewall (12, 112) including a peripheral standing ring (20, 120) and an arcuate dome-shaped end wall (26, 126), said dome-shaped end wall (26, 126) being movable relative to said standing ring (20, 120) and sidewall (12, 112) between an as-formed outwardly projecting position and an inverted position in which said dome-shaped end wall (26, 126) extends within said sidewall (12, 112) below a plane (P, $P_A$) extending through said standing ring (20, 120), said outwardly projecting position also being a dispensing position.

17. An intermediate article (44) according to claim 16, wherein, when said dome-shaped end wall (26, 126) is positioned in said inverted position, said standing ring (20, 120) forms a support surface on which said intermediate body (44) is supportable in a free standing position with said open end (16) facing upwardly.

18. An intermediate article (44) according to claim 17, further comprising a sheet-like tamper-indication covering (28, 128) bonded to said standing ring (20, 120) and extending over said dome-shaped end wall (26, 126) in said inverted position to seal and prevent contamination of said dome-shaped end wall (26, 126).

19. An intermediate article (44) according to claim 17, wherein said flexible tubular sidewall (12, 112) has a substantially cylindrical shape, wherein said dome-shaped end wall (26, 126) is arcuate in both said outwardly projecting and inverted positions and has an apex; and wherein a dispensing port (32, 132) is located on said apex.

20. An intermediate article (4) according to claim 16, further comprising an integrally molded removable tab (30) integrally projecting from said dome-shaped end wall (26) and ultimately being removable from said dome-shaped end wall (26) to create a dispensing opening (32) in the squeezable plastic tube-shaped container (10), said tab (30) being located within said sidewall (12) below a plane (P) extending through said standing ring (20) when said dome-shaped end wall (26) is in said inverted position and is readily accessible when said end wall (26) is in said outwardly projecting position.

21. A squeezable plastic tube-shaped container (10, 100), comprising:

a flexible plastic extrusion blow molded sidewall (12, 112) having a dispensing end (14, 114) defined by a peripheral circular standing ring (20, 120) and an opposite filling end (16) sealed closed by a seam (18); and an end wall (26, 126) blow molded integrally with said sidewall (12, 112), extending from said standing ring (20, 120), and closing said dispensing end (14, 114), said end wall (26, 126) being positionable in a storage position such that said end wall (26, 126) is concave and extends inwardly within said sidewall (12, 112) completely below an imaginary plane (P, P$_A$) extending through said standing ring (20, 120), and being positionable in a dispensing position such that said end wall (26, 126) extends outwardly of said sidewall (12, 112) above said imaginary plane (P, P$_A$) extending through said standing ring (20, 120).

22. A squeezable plastic tube-shaped container (10, 100) according to claim 21, wherein a live hinge (34, 134) is formed at the intersection of said standing ring (20, 120) and said end wall (26, 126) and enables said end wall (26, 126) to snap outwardly from said dispensing end (14, 114) of said sidewall (12, 112) and extend in a substantially convex shape above said imaginary plane (P, P$_A$) extending through said standing ring (20, 120) when said flexible sidewall (12, 112) is squeezed to enable ready access to a dispensing opening (32, 132) in said end wall (26, 126).

23. A squeezable plastic tube-shaped container (10, 100) according to claim 22, wherein, when said end wall (26, 126) is in said storage positioned, said standing ring (20, 120) forms a support surface on which the squeezable plastic tube-shaped container (10, 100) is supportable in a free-standing position with said seam (18) facing upwardly.

24. A squeezable plastic tube-shaped container (10, 100) according to claim 23, further comprising a sheet-like tamper-indication covering (28, 128) bonded to said standing ring (20, 120) and extending over said end wall (26, 126) when said end wall (26, 126) is in said storage position to seal and prevent contamination of said end wall (26, 126).

25. A squeezable plastic tube-shaped container (10, 100) according to claim 23, wherein said end wall (26, 126) is arcuate and has a central apex region, and wherein said dispensing opening (32, 132) is located in said central apex region.

26. A squeezable plastic tube-shaped container (10, 100) according to claim 23, wherein the container (10, 100) is manufactured as a one-piece plastic integral container made entirely of a predetermined material.

27. A squeezable plastic tube-shaped container (10) according to claim 21, further comprising a removable tab (30) for creating a dispensing opening (32) in said end wall (26), said tab (30) being formed integrally with said end wall (26) and being located between said end wall (26) and said imaginary plane (P) extending through said standing ring (20) when said end wall (26) is in said storage position.

28. A squeezable plastic tube-shaped container (10) according to claim 27, wherein said tab (30) has at least one lateral projection (36) which is useable to plug said dispensing opening (32) after said tab (30) has been initially removed from said end wall (26) to create said dispensing opening (32).

* * * * *